(12) United States Patent
Tan et al.

(10) Patent No.: US 8,103,042 B2
(45) Date of Patent: Jan. 24, 2012

(54) CASE FOR CONTAINING A PORTABLE MEDIA PLAYER

(75) Inventors: Hwee Bun Tan, Singapore (SG); Kin Wah Chan, Singapore (SG); Kok Huan Ong, Singapore (SG)

(73) Assignee: Creative Technology Ltd, Singapore (SG)

( * ) Notice: Subject to any disclaimer, the term of this patent is extended or adjusted under 35 U.S.C. 154(b) by 1195 days.

(21) Appl. No.: 11/766,729

(22) Filed: Jun. 21, 2007

(65) Prior Publication Data

US 2008/0316683 A1  Dec. 25, 2008

(51) Int. Cl.
*H04R 1/02* (2006.01)
(52) U.S. Cl. .......................................... 381/388; 381/386
(58) Field of Classification Search .................. 381/388; 361/679.01; 379/430, 433.02
See application file for complete search history.

(56) References Cited

U.S. PATENT DOCUMENTS 3,627,392 A * 12/1971 Ruppersburg ............... 369/82
6,914,995 B2 * 7/2005 Kao ........................ 379/433.02

* cited by examiner

*Primary Examiner* — Brian Ensey

(57) ABSTRACT

There is provided a case for containing a portable media player, the case including: a frame for placement of the media player; and a speaker driver mounted in a cabinet, the speaker driver connectable to an audio output of the media player. The media player may be either permanently located within the case or removable from the case. The speaker driver may be connected to the audio output of the media player using either a wired connection or a wireless connection, the speaker driver being exposed when the case is in an open mode and the speaker driver being concealed when the case is in a closed mode. The case alternates between the open mode and the closed mode using fasteners such as, for example, adhesive strips, Velcro strips, magnetic strips, or a zipper.

19 Claims, 2 Drawing Sheets

CASE FOR CONTAINING A PORTABLE MEDIA PLAYER

FIELD OF INVENTION

This invention relates to a case for containing a media player, the case being capable of protecting the media player contained within the case, and being able to enable various ways of listening to audio playback from the media player.

BACKGROUND

An audio output of a media player is usually in stereo form with a left and a right channel producing differing signals at differing frequencies and amplitudes. A multi-speaker driver arrangement is generally able to reproduce the stereo audio output of the media player, but the multi-speaker driver arrangement may not be an ideal arrangement in instances where there are space constraints. Space constraints usually result in the reduction of the size of each of the plurality of speaker drivers and this generally has an adverse effect on the quality of sound reproduction.

The size of portable media players is getting smaller with the rapid advancement of technology. Correspondingly, the size of media player accessories has also been shrinking to keep pace with the miniaturization of media players. It is foreseeable that a user of a small portable media player would prefer a case similar in size to the media player rather than a larger/bulkier case. In this regard, incorporating a multi-speaker driver system in a sleek/small/slim case (to playback content from the media player) would inevitably face the space constraint issues mentioned earlier.

In many instances, cases for portable media players do not allow for transmission of sound when in a closed mode. This usually limits the usability of the cases.

SUMMARY

There is provided a case for containing a portable media player, the case including: a frame for placement of the media player; and a speaker driver mounted in a cabinet, the speaker driver connectable to an audio output of the media player. The media player may be either permanently located within the case or removable from the case. The speaker driver may be connected to the audio output of the media player using either a wired connection or a wireless connection, the speaker driver being exposed when the case is in an open mode and the speaker driver being concealed when the case is in a closed mode. The case alternates between the open mode and the closed mode using fasteners such as, for example, adhesive strips, Velcro strips, magnetic strips, or a zipper.

It is preferable that the wired connection is enabled by a cable with a jack. The cable with a jack may be removably incorporated within the frame and the cabinet. The cable with a jack may also function as an antennae for reception of FM signals. The wireless connection may be enabled by wireless technologies such as, for example, Wifi, Bluetooth, WiMax, and UWB.

The frame and the cabinet may be both located in a first compartment of the case, or the frame may be located in a first compartment of the case with the cabinet being located in a second compartment of the case. Preferably, an outer surface of the case may be water proofed.

It is preferable that the speaker driver may include a voice coil, the voice coil having a first voice coil winding and a second voice coil winding, the first voice coil winding receiving a first input from the audio output of the media player and the second voice coil winding receiving a second input from the audio output of the media player. It is advantageous that the first voice coil winding and the second voice coil winding causes in-phase vibration of the voice coil such that the speaker driver vibrates during playback of content of the media player connected to the speaker driver.

Preferably, the frame and cabinet may be made from a force suppressing material, the force suppressing material being, for example, Styrofoam, high density sponge, elastomer, rubber and the like. The cabinet may have a raised rim along a perimeter of an exposed face of the speaker driver, the raised rim being to prevent compression of the speaker driver when the case is in a closed mode. The cabinet may anchor the speaker driver to the case.

The media player may be controllable when the case is in a closed mode, controls of the media player being activated either directly or remotely. The controls may preferably be located at an outer surface of the case and the direct activation of the controls may be via physical contact. Alternatively, the remote activation of functions of the media player may use wireless technologies such as, for example, Wifi, Bluetooth, WiMax, infra-red and UWB.

Preferably, the case is not airtight when in a closed mode. As such, sound may be transmittable from the speaker driver to a region around the case when the case is in a closed mode.

The case may further include a connector of the media player located at an outer surface of the case. The connector may preferably be for signals selected from the group consisting of: data, electrical and both of the aforementioned. The connector may be of the type like, for example, USB connector, mini-USB connector, IEEE1394 connector and a proprietary connector.

The case may also further include a set of headphones/earphones (wired or wireless) connectable to the audio output of the media player with a cable of the set of headphones/earphones being retractable into the case. In such a setup, there may be a switch that allows connection of either the set of headphones/earphones or the speaker driver to the audio output of the media player. Wireless transmission to the set of wireless headphones/earphones may be using wireless technologies such as, for example, Wifi, Bluetooth, WiMax, infrared or UWB.

The case may also include a microphone with an analog-digital converter.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

FIG. 5 is a perspective view of the second embodiment of the present invention in a closed mode.

FIG. 6 is a perspective view of a third embodiment of the present invention in an open mode.

FIG. 7 is a perspective view of the third embodiment of the present invention in a closed mode.

DESCRIPTION OF PREFERRED EMBODIMENTS

Figure 1:
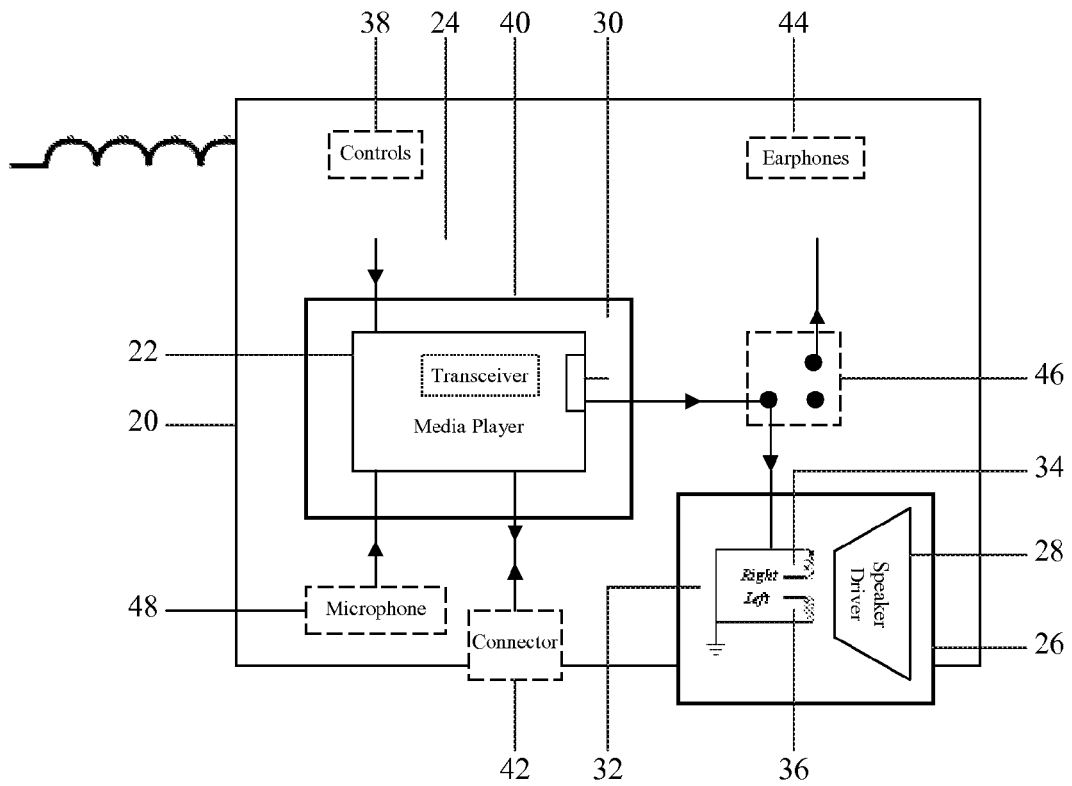
FIG. 1 is a schematic representation of the present invention.

Referring to FIG. 1, there is provided a schematic representation of the present invention. The present invention is a case 20 for containing a portable media player 22. The media player 22 may be either permanently located (incorporated) within the case 20 or removable from the case 20. The case 20 may be for storage and protection of the media player 22, and may provide other functionalities that will become evident in later portions of the description. The case 20 may include a frame 24 for placement of the media player 22. The frame 24 may be designed for placement of a specific model of a media player 22 or may be designed for placement of a range of media players 22 of a particular size, shape, manufacturer and so forth. The frame 24 may be made/formed from a force suppressing (shock absorbing) material so that the media player 22 placed within the frame 24 is insulated from force/impact. The force suppressing material may be a material such as, for example, Styrofoam, high density sponge, elastomer, rubber and the like.

The case 20 may also include a cabinet 26 for mounting a speaker driver 28. The cabinet 26 may be designed for mounting a speaker driver 28 of a specific model/size. The cabinet 26 may also anchor the speaker driver 28 to the case 20. The cabinet 26 may be made/formed from a force suppressing (shock absorbing) material so that circuitry of the speaker driver 28 mounted within the cabinet 26 is insulated from force. The force suppressing material may be a material such as, for example, Styrofoam, high density sponge, elastomer, rubber and the like.

The speaker driver 28 may be connectable to an audio output 30 of the media player 22. The speaker driver 28 may be connected to the audio output 30 of the media player 22 using either a wired connection or a wireless connection. The wired connection may be enabled by a cable with a jack. This is more clearly shown in later figures and described in subsequent sections of the description. The wireless connection between the media player 22 and the speaker driver 28 may enabled by wireless technologies such as, for example, Wifi, Bluetooth, WiMax, and UWB. The media player 22 may have a transceiver 40 to enable the wireless connection. Similarly, the speaker driver 28 may also include a wireless receiver.

The speaker driver 28 may include a voice coil 32, the voice coil 32 having a first voice coil winding 34 and a second voice coil winding 36. The first voice coil winding 34 may receive a first input from the audio output 30 of the media player 22 and the second voice coil winding 36 may receive a second input from the audio output 30 of the media player 22. As such, the first voice coil winding 34 and the second voice coil winding 36 causes in-phase vibration of the voice coil 30 such that the speaker driver 28 vibrates during playback of content of the media player 22 connected to the speaker driver 28. The dual inputs from the audio output 30 of the media player 22 is due to stereo output from the media player 22. Such in-phase vibration of the voice coil 30 causes a summation of the stereo signals and correspondingly produces a sound output of a louder volume to an order of approximately three decibels.

The case 20 may have two modes, namely an open and a closed mode. The speaker driver 28 may be exposed when the case 20 is in an open mode and the speaker driver 28 may be concealed when the case 20 is in a closed mode. It is preferable that the case 20 is not airtight when in a closed mode. As such, sound is able to be transmitted from the speaker driver 28 to a region around the case 20 when the case 20 is in a closed mode. The two modes of the case 20 will be shown in later figures and described in subsequent sections of the description.

In an alternative embodiment of the present invention, the case 20 may include controls 38 for controlling the media player 22 in the case 20. The controls 38 may be for standard media player 22 functions such as, for example, play, pause, stop, volume control, track selection and the like. The controls 38 may be located at an outer surface of the case 20 (shown in a later figure and described in a subsequent section of the description) and direct activation of the controls 38 may be via physical contact. As the controls 38 are located at an outer surface of the case 20, the media player 22 may thus be controllable when the case 20 is in a closed mode. Activation of the controls 38 by physical contact may be enabled when the controls 38 are aligned (function-wise) with a corresponding set of controls on the media player 22. In such an arrangement, application of a physical force onto "play" on controls 38 would correspondingly activate "play" on the media player 22. Similarly, application of a physical force onto "next track" would correspondingly activate "next track" on the media player 22 and so forth. Functions of the media player 22 may be activated remotely. The transceiver 40 of the media player 22 may receive instructions from the controls 38 or a separate remote control using wireless technologies such as, for example, Wifi, Bluetooth, WiMax, infra-red, UWB and the like. In such an alternative embodiment, a connector 42 of the media player 22 may also located at the outer surface of the case 20. The connector 42 may be for the input and output of signals like data, electrical or both data and electrical signals. The connector 42 may allow for the input/output of data to/from the media player 22 and may also allow for a power source in the media player 22 to be recharged. The power source may typically be a battery. The connector 42 may be of the form, such as, for example, USB connector, mini-USB connector, IEEE1394 connector or a proprietary connector. There may also be a set of headphones/earphones 44 connectable to the audio output 30 of the media player 22. A switch 46 may allow the connection of the audio output 30 to either the headphones/earphones 44 or the speaker driver 28.

Figure 2:
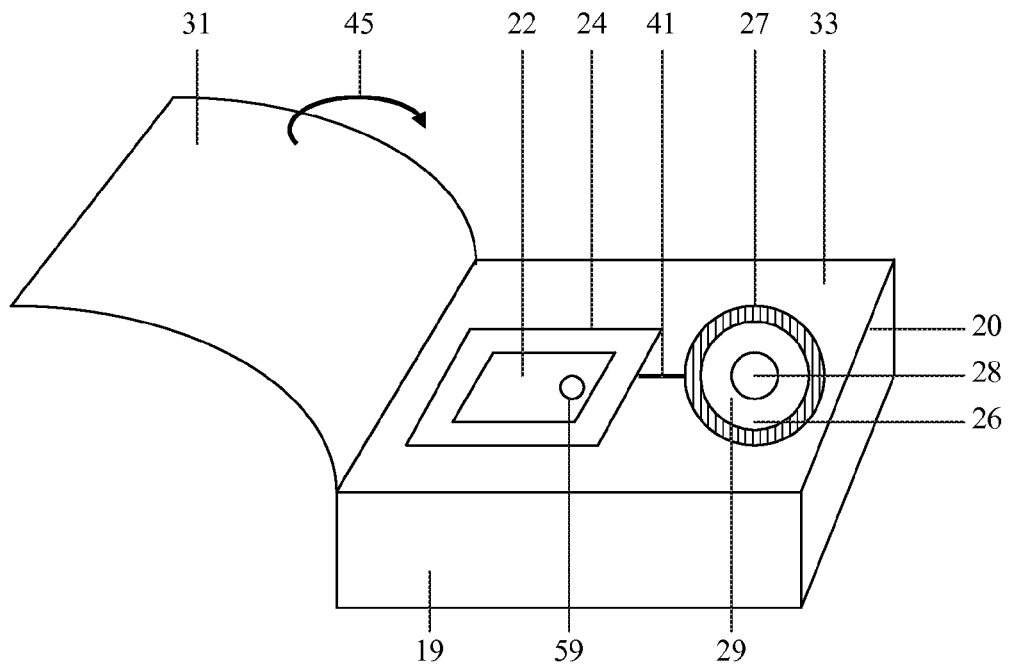
FIG. 2 is a perspective view of a first embodiment of the present invention in an open mode.
Figure 3:
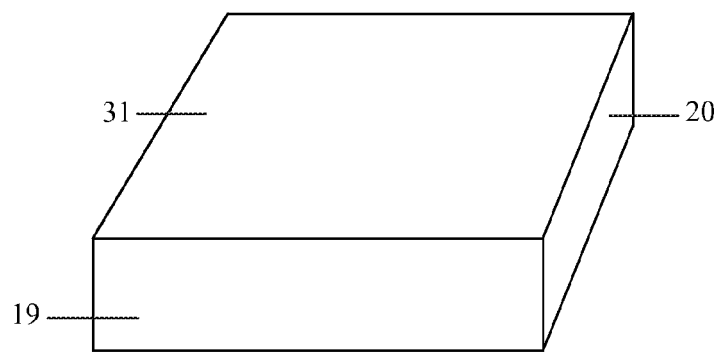
FIG. 3 is a perspective view of the first embodiment of the present invention in a closed mode.

The case 20 may also include a microphone 48 for recording audio signals in the media player 22. The microphone 48 may preferably include an analog-digital converter to ensure that digital signals are input in the media player 22. Referring to FIG. 2, there is shown a perspective view of a first embodiment of the present invention in an open mode. In the first embodiment, it can be seen that the frame 24 and the cabinet 26 are both located in a single compartment 19 of the case 20. As per the earlier section of the description, the media player 22 is contained within the frame 24 and the speaker driver 28 is mounted within the cabinet 26. The media player 22 may be either permanently located within the case 20 or removable from the case 20. It is preferable that the cabinet 26 has a raised rim 27 along a perimeter of an exposed face 29 of the speaker driver 28, the raised rim 27 being for the prevention of compression of the speaker driver 28 when the case 20 is in a closed mode (as shown in FIG. 3). In this first embodiment, it can been seen that the frame 24 is designed for placement of a specific model of a media player 22, namely, the Zen Stone from Creative Technology Ltd. But it should be noted that the frame 24 may be designed for placement of media players 22 of a particular size, shape, manufacturer and so forth.

The case 20 is in the closed mode when a cover 31 is securably placed over an exposed face 33 of the single compartment 19. The cover 31 may be securably placed over the exposed face 33 of the single compartment 19 using fasteners such as, for example, adhesive strips, Velcro strips, magnetic strips, zippers and the like. It is preferable that the case 20 is not airtight when in a closed mode. As such, sound is able to be transmitted from the speaker driver 28 to a region around the case 20 when the case 20 is in a closed mode.

While the cover 31 is shown to be hinged to an edge of the exposed face 29 of the single compartment 19, the cover 31 may be a separate or detachable item. A direction 45 as shown is representative of how the cover 31 is positioned to cause the case 20 to be in the closed mode. However, this direction 45 should not be taken to be limitative in any manner. The cover 31 may be made from a water resistant material, such as, for example, plastics, metals, waxed fabrics and the like. Similarly, the cover 31 may be made from a non-water resistant material if surfaces exposed to an ambient environment are coated with a material to make the cover 31 water-resistant. The single compartment 19 may also be made from a water resistant material, such as, for example, plastics, metals, waxed fabrics and the like. The single compartment 19 may be made from a non-water resistant material if surfaces exposed to the ambient environment are coated with a material to make the single compartment 19 water-resistant. Water repulsion by the single compartment 19 and the cover 31 when the case 20 is in the closed mode may aid in preventing water-related damage (but not when the case is submerged in water) to the media player 22 and the speaker driver 28 in the case 20.

In the first embodiment of the present invention, there may be a wired connection 41 in the form of a cable with a jack that may be removably incorporated within the frame 24 and the cabinet 26. The cable with a jack may function as an antennae for reception of FM signals. It is known in the art that a longer cable generally improves reception of FM signals by the media player 22 and so the cable used may be designed to be as long as possible as per space constraints.

Figure 4:
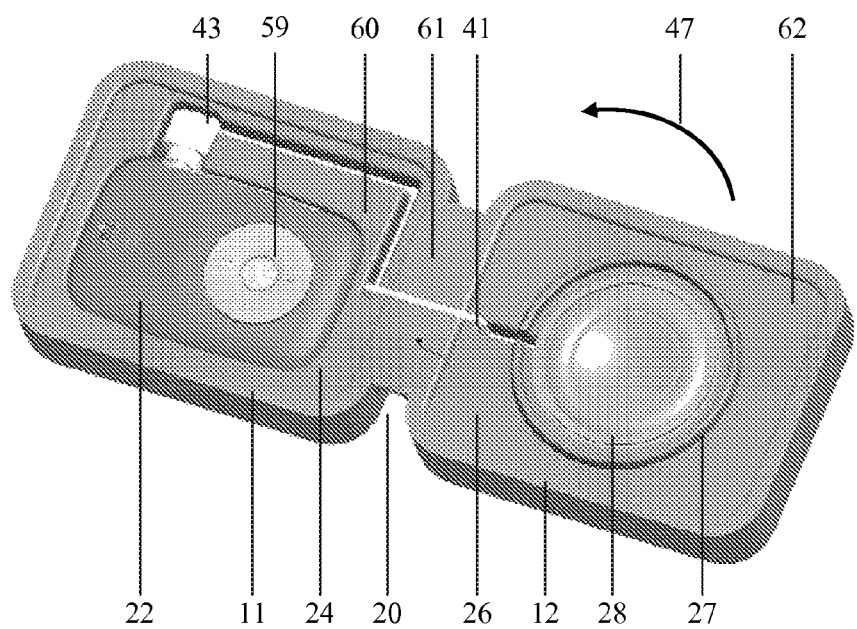
FIG. 4 is a perspective view of a second embodiment of the present invention in an open mode.

Referring to FIG. 4, there is shown a perspective view of a second embodiment of the present invention in an open mode. In the second embodiment, it can be seen that the frame 24 is located in a first compartment 11 of the case 20 and the cabinet 26 is located in a second compartment 12 of the case 20. As per the earlier section of the description, the media player 22 is contained within the frame 24 and the speaker driver 28 is mounted within the cabinet 26. The media player 22 may be either permanently located within the case 20 or removable from the case 20. It is preferable that the cabinet 26 has a raised rim 27 along a perimeter of an exposed face 29 of the speaker driver 28, the raised rim 27 being for the prevention of compression of the speaker driver 28 when the case 20 is in a closed mode (as shown in FIG. 5). In this second embodiment, it can been seen that the frame 24 is designed for placement of a specific model of a media player 22, namely, the Zen Stone from Creative Technology Ltd. But it should be noted that the frame 24 may be designed for placement of media players 22 of a particular size, shape, manufacturer and so forth.

The case 20 is in the closed mode when the second compartment 12 is flipped and placed over an exposed face 60 of the first compartment 11. The second compartment 12 may be placed over the exposed face 60 of the first compartment 11 and secured to the second compartment 12 using fasteners such as, for example, adhesive strips, Velcro strips, magnetic strips, zippers and the like. It is preferable that the case 20 is not airtight when in a closed mode. As such, sound is able to be transmitted from the speaker driver 28 to a region around the case 20 when the case 20 is in a closed mode.

In the second embodiment of the present invention, it is preferable that the first compartment 11 and the second compartment 12 are attached to one another with a hinge 61. A direction 47 as shown is representative of how the second compartment 12 is flipped and placed over an exposed face 60 of the first compartment 11 to cause the case 20 to be in the closed mode. However, this direction 47 should not be taken to be limitative in any manner. It may also be possible for the first compartment 11 to be flipped and placed over an exposed face 62 of the second compartment 12 to cause the case 20 to be in the closed mode. Both the first compartment 11 and the second compartment 12 may be made from a water resistant material, such as, for example, plastics, metals, waxed fabrics and the like. The first compartment 11 and the second compartment 12 may be made from a non-water resistant material if their surfaces which are exposed to an ambient environment are coated with a material to make them water-resistant. Water repulsion by the first compartment 11 and the second compartment 12 when the case 20 is in the closed mode may aid in preventing water-related damage (but not when the case is submerged in water) to the media player 22 and the speaker driver 28 in the case 20.

In the second embodiment of the present invention, there may also be a wired connection 41 in the form of a cable with a jack 43 that may be removably incorporated within the frame 24 and the cabinet 26. The cable with a jack 43 may function as an antennae for reception of FM signals. It is known in the art that a longer cable generally improves reception of FM signals by the media player 22 and so the cable used may be designed to be as long as possible as per space constraints.

Referring to FIG. 6, there is shown a perspective view of a third embodiment of the present invention in an open mode. In the third embodiment, it can be seen that the frame 24 is located in a first compartment 11 of the case 20 and the cabinet 26 is located in a second compartment 12 of the case 20. As per the earlier section of the description, the media player 22 is contained within the frame 24 and the speaker driver 28 is mounted within the cabinet 26. The media player 22 may be either permanently located within the case 20 or removable from the case 20. It is preferable that the cabinet 26 has a raised rim 27 along a perimeter of an exposed face 29 of the speaker driver 28, the raised rim 27 being for the prevention of compression of the speaker driver 28 when the case 20 is in a closed mode (as shown in FIG. 7). In this third embodiment, it can been seen that the frame 24 is designed for placement of a specific model of a media player 22, namely, the Zen Stone from Creative Technology Ltd. But it should be noted that the frame 24 may be designed for placement of media players 22 of a particular size, shape, manufacturer and so forth.

The case 20 is in the closed mode when the second compartment 12 is flipped and placed over an exposed face 60 of the first compartment 11. The second compartment 12 may be placed over the exposed face 60 of the first compartment 11 and secured to the second compartment 12 using fasteners such as, for example, adhesive strips, Velcro strips, magnetic strips, zippers and the like. It is preferable that the case 20 is not airtight when in a closed mode. As such, sound is able to be transmitted from the speaker driver 28 to a region around the case 20 when the case 20 is in a closed mode.

In the third embodiment of the present invention, it is preferable that the first compartment 11 and the second compartment 12 are attached to one another with a hinge 61. Both the first compartment 11 and the second compartment 12 may be made from a water resistant material, such as, for example, plastics, metals, waxed fabrics and the like. The first compartment 11 and the second compartment 12 may be made from a non-water resistant material if their surfaces which are exposed to an ambient environment are coated with a material to make them water-resistant. Water repulsion by the first compartment 11 and the second compartment 12 when the case 20 is in the closed mode may aid in preventing water-related damage (but not when the case is submerged in water) to the media player 22 and the speaker driver 28 in the case 20.

In the third embodiment of the present invention, there may also be a wired connection 41 in the form of a cable with a jack 43 that may be removably incorporated within the frame 24 and the cabinet 26. The cable with a jack 43 may function as an antennae for reception of FM signals. It is known in the art that a longer cable generally improves reception of FM signals by the media player 22 and so the cable used may be designed to be as long as possible as per space constraints. The jack 43 may also enable connection to a set of earphones/headphones 70. A switch 71 may be included with the jack 43 to enable switching between audio output through the earphones/headphones 70 or the speaker driver 28. While it can be seen from FIG. 6 that the switch 71 is part of the jack 43, it should be noted that the switch 71 may be included anywhere in the case 20, as long as toggling audio output between the set of earphones/headphones 70 or the speaker driver 28 is enabled. It is preferable that a cable of the set of earphones/headphones 70 is retractable (either manually or automatically) into the case 20 so that storage of the cable of the set of earphones/headphones 70 is convenient for a user of the case 20. The switch 71 may also be used to enable transmission of wireless signals to a set of wireless earphones/headphones 70 to enable audio output through the earphones/headphones 70. The wireless signals may be transmitted using wireless technologies such as, for example, Wifi, Bluetooth, WiMax, infra-red, UWB and the like.

With reference to FIG. 7, in the third embodiment of the present invention, the case 20 may include controls 38 for controlling the media player 22 in the case 20. The controls 38 may be for standard media player 22 functions such as, for example, play, pause, stop, volume control, track selection and the like. The controls 38 may be located at an outer surface of the case 20 and direct activation of the controls 38 may be via physical contact. The media player 22 may thus be controllable when the case 20 is in a closed mode. Activation of the controls 38 by physical contact may be enabled when the controls 38 are aligned (function-wise) with a corresponding set of controls on the media player 22 like a set 59 shown in FIGS. 2 and 4. In such an arrangement, application of a physical force onto "play" on controls 38 would correspondingly activate "play" on the set 59 on the media player 22. Similarly, application of a physical force onto "next track" would correspondingly activate "next track" on the set 59 on the media player 22 and so forth. Functions of the media player 22 may also be activated remotely by activating controls 38. The media player 22 may include the tranceiver 40 to receive instructions from the controls 38 or a separate remote control using wireless technologies such as, for example, Wifi, Bluetooth, WiMax, infra-red, UWB and the like.

In the third embodiment, there may be a connector 42 of the media player 22 that may be located at an outer surface of the case 20 (as shown in FIG. 7). The connector 42 may be for the input and output of signals like data, electrical or both data and electrical signals. The connector 42 may allow for the input/output of data to/from the media player 22 and may also allow for a power source in the media player 22 to be recharged. The power source may typically be a battery. The connector 42 may be of the form, such as, for example, USB connector, mini-USB connector, IEEE1394 connector or a proprietary connector.

Whilst there has been described in the foregoing description preferred embodiments of the present invention, it will be understood by those skilled in the technology concerned that many variations or modifications in details of design or construction may be made without departing from the present invention.

What is claimed is:

1. A case for containing a portable media player, the case including:
   a frame for placement of the media player; and
   a speaker driver mounted in a cabinet, the speaker driver connectable to an audio output of the media player;
   wherein the speaker driver is connected to the audio output of the media player using either a wired connection or a wireless connection, the speaker driver being exposed when the case is in an open mode and the speaker driver being concealed when the case is in a closed mode, and
   wherein sound is transmittable from the speaker driver to a region around the case when the case is in a closed mode.

2. The case of claim 1, wherein the frame and the cabinet are both located in a first compartment of the case.

3. The case of claim 1, wherein the frame is located in a first compartment of the case and the cabinet is located in a second compartment of the case.

4. The case of claim 1, wherein the speaker driver includes a voice coil, the voice coil having a first voice coil winding and a second voice coil winding, the first voice coil winding receiving a first input from the audio output of the media player and the second voice coil winding receiving a second input from the audio output of the media player.

5. The case of claim 4, wherein the first voice coil winding and the second voice coil winding causes in-phase vibration of the voice coil such that the speaker driver vibrates during playback of content of the media player connected to the speaker driver.

6. The case of claim 1, wherein the wired connection is enabled by a cable with a jack.

7. The case of claim 6, wherein the cable with a jack is removably incorporated within the frame and the cabinet.

8. The case of claim 1, wherein the wireless connection is enabled by wireless technologies selected from the group consisting of: Wifi, Bluetooth, WiMax, and UWB.

9. The case of claim 1, wherein the frame and cabinet is made from a force suppressing material, the force suppressing material selected from the group consisting of: Styrofoam, high density sponge, elastomer, and rubber.

10. The case of claim 1, wherein the cabinet has a raised rim along a perimeter of an exposed face of the speaker driver, the raised rim being to prevent compression of the speaker driver when the case is in a closed mode.

11. The case of claim 1, wherein the media player is controllable when the case is in a closed mode, controls of the media player being activated either directly or remotely.

12. The case of claim 11, wherein the controls are located at an outer surface of the case and the direct activation of the controls is via physical contact.

13. The case of claim 11, wherein the remote activation of functions of the media player uses wireless technologies selected from the group consisting of: Wifi, Bluetooth, WiMax, infra-red and UWB.

14. The case of claim 1, wherein the media player is either permanently located within the case or removable from the case.

15. The case of claim 1, further including a connector of the media player located at an outer surface of the case, the connector being for signals selected from the group consisting of: data, electrical and both of the aforementioned.

16. The case of claim 15, wherein the connector is selected from the group consisting of: USB connector, mini-USB connector, IEEE1394 connector and a proprietary connector.

17. The case of claim 1, further including a set of headphones/earphones connectable to the audio output of the media player, a cable of the set of headphones/earphones being retractable into the case.

18. The case of claim 17, further including a switch that allows connection of either the set of headphones/earphones or the speaker driver to the audio output of the media player.

19. The case of claim 1, further including a microphone, the microphone including an analog-digital converter.

* * * * *